W. A. HUNNICUTT.
CORNSTALK TURNER.
APPLICATION FILED OCT. 18, 1918.
1,297,173.
Patented Mar. 11, 1919.
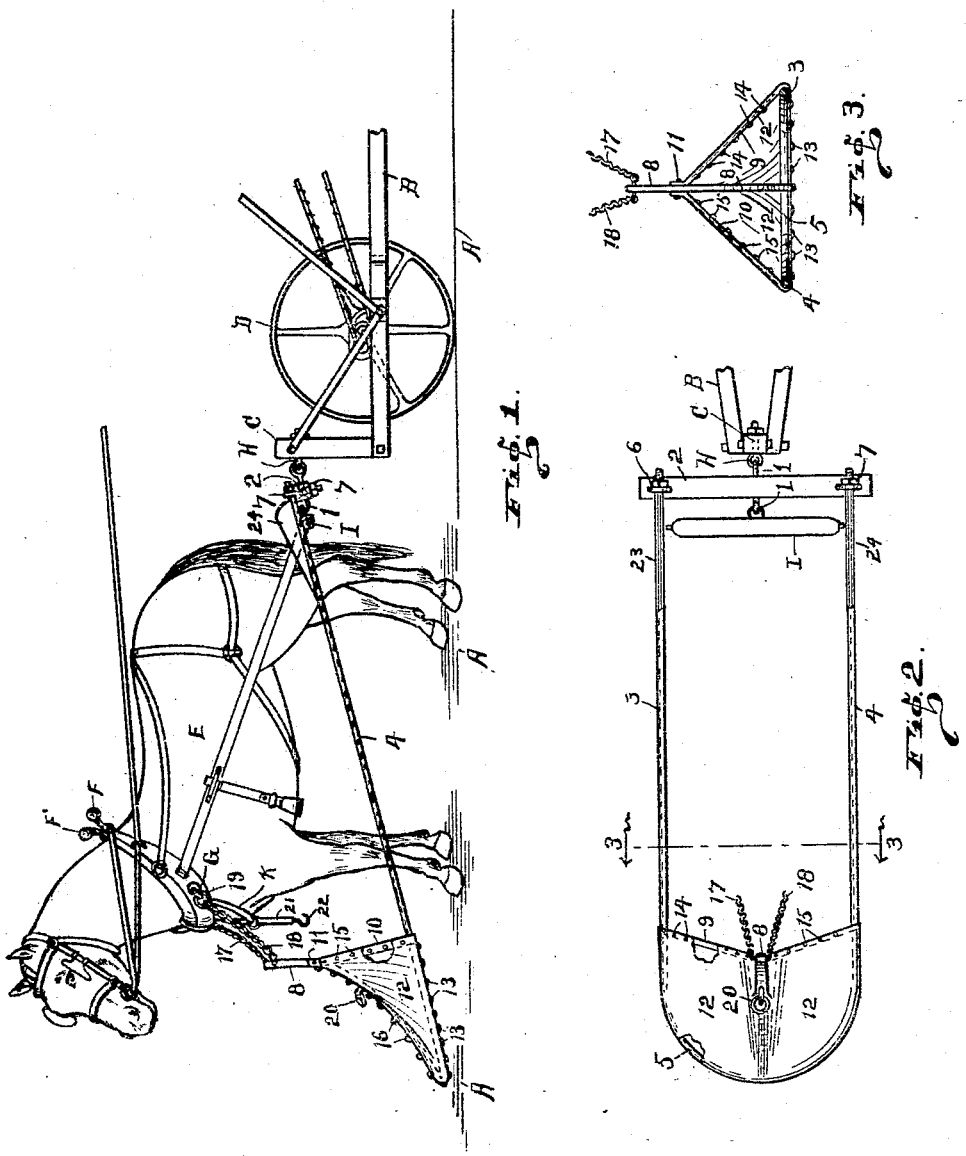

UNITED STATES PATENT OFFICE.

WALTER A. HUNNICUTT, OF NEAR GREENSFORK, INDIANA.

CORNSTALK-TURNER.

1,297,173.  Specification of Letters Patent.  Patented Mar. 11, 1919.

Application filed October 18, 1918. Serial No. 258,668.

*To all whom it may concern:*

Be it known that I, WALTER A. HUNNICUTT, a citizen of the United States, residing near Greensfork, in the county of Wayne, State of Indiana, have invented a new and useful Cornstalk-Turner, of which the following is a full, clear, and comprehensive specification and exposition, the same being such as will enable others to make and use the same with exactitude.

My invention relates to agricultural tools.

In order to conserve man power and to increase the production of wheat, and incidentally to reduce the expense of producing wheat, is the predominant object of this invention.

It is well known that it is usual to drill fall wheat between the rows of standing corn, and it is usually the case that the corn has fallen over, more or less, across the space between the rows, thereby making it almost impossible to operate a horse and drill between the rows of corn without first having a person go ahead of the horse and straighten up the stalk or push them out of the way, this not only requires a great amount of time, labor, and expense, but also a consequent damage to the corn as it has to be turned far beyond what is actually required for the horse to get through, in order that the stalks will stand alone when released, this of course either breaks the stalk or loosens the roots, thereby resulting in damage to the corn.

My invention is adapted to overcome all of said difficulties and to attain the desired results in a simple and inexpensive manner.

The means for carrying out the objects of my invention in an efficient, economical, and practical manner is shown in the accompanying drawings, in which—Figure 1 is a side elevation of my invention as it would appear in actual practice, showing its connection with an agricultural machine such as a drill and with the motive power or horse. Fig. 2 is a top plan view of the invention. And Fig. 3 is a cross section of the invention, as taken on the line 3—3 of Fig. 2.

Similar indices denote like parts throughout the several views.

In order that the construction, the operation, and the advantages of my invention may be more fully understood and appreciated I will now take up a detail description thereof in which I will set forth the various features as fully and as comprehensively as I may. Referring now to the drawings in detail:

Letter A denotes the ground-line. B denotes the frame of an ordinary grain drill, of which C denotes the draft-post to which a horse or other motive power is hitched. D denotes the ground wheel of the drill. Letter E denotes the motive power, which in this instance is a horse. The horse, in this instance, is equipped with harness, including a collar which carry the hames F and F', the latter having the usual side rings, as the ring G in Fig. 1.

Extending through the upper portion of the draft post is the eye-bolt or hook H which ordinarily is employed to secure the swingletree I. In applying my invention the swingletree is removed from the eye-bolt H, after which the hook-bolt 1 is engaged with the eye-bolt H, and the swingletree I is then engaged with the hook on the forward end of the hook-bolt 1.

Numeral 2 denotes the body-bar of my device, the same being forward of and located at right-angles to the post C, and the center portion of the hook-bolt 1 is secured in the center of the body-bar 2, as indicated.

The main portion of my device consists of a frame, which I have found advisable to form by a single length of ordinary pipe or angle-iron, thereby providing the side-bars 3 and 4, which are parallel with each other, and the bow portion 5, formed segmentally, and connecting the forward ends of the side-bars integrally together, or they may be of separate lengths if desired.

The rear ends of the side-bars are secured to the end portions of the body-bar 2 by the respective U-bolts 6 and 7.

Numeral 8 denotes the stempost, or stemhead, one end of which is secured to the center of the bow 5, from which it extends rearward and upward in a curve, with its upper or rear end portion located in an approximately vertical position.

Extending downwardly and divergently from the upper portion of the stempost 8 are the braces 9 and 10, to which they are secured by the bolt 11. The lower ends of said braces are secured to the respective side-bars 3 and 4 slightly in the rear of the bow 5.

Numeral 12 denotes the sheet metal, which is bent and cut to conform with the contour of the stempost 8, the bow 5, and the braces 9 and 10, all of which it covers.

The sheeting 12 curves partly around projecting bow 5, to which it is secured by a plurality of rivets 13; it is secured to the braces 9 and 10 by a plurality of rivets 14 and 15; and it is secured on the stempost by a plurality of rivets 16.

Numerals 17 and 18 denote supporting chains which are attached to the sides of the upper projecting portion of the stempost. The other ends of said chains are provided with hooks, as the hook 19 in Fig. 1, which hooks are detachably connected with their respective rings G of hames of the harness. The length of said chains 17 and 18 is such as to suspend the point or prow of the bow 5 a short distance above the ground A. K denotes the breast strap, connected in the rings G. 20 denotes a ring secured to post 8. 21 denotes a supporting strap. And 22 denotes a snap secured to strap 21.

*Modus operandi.*—In practice my device may be manufactured simply as an attachment for grain drills, and then when required for use it is simply connected thereto by means of the bolt 1. The swingletree is then attached to the hook of the bolt 1. The horse E is then placed between the side-bars 3 and 4, after which the chains 17 and 18 connected, by means of the hooks 19, to the hames of the harness, and the device is then ready for operation. Now as the horse walks forward between two rows of standing corn it is evident that the prow, or front portion, of the device will run under the stalks which are across the path, and they will slide upward on the sheeting and thereby brought to position outside the path of the horse, this manifestly will only force the stalks sufficient to allow the horse, the drill, and the driver to pass through, and without straining the stalks aside such as to cause them to break or to disturb their roots, and permitting them to fall back as before as soon as the drilling operation is completed.

Arriving at the end of the row one has only to lift the forward portion of the device, then connect the snap 22 in the ring 20, thereby suspending the forward portion of the device from the breast strap K, and this will permit the horse to turn around in the usual manner, after which the device may be lowered to the position in which it is shown in Fig. 1.

While I have herein shown the motive power as a horse, it is to be understood that I am not limited thereto, as mechanical or other motive power may be employed in connection with the drill and with my invention.

I would also have it understood that this invention has been thoroughly tested, and it has given entire satisfaction under all conditions, and it absolutely eliminates the necessity of manually turning the stalks of corn, thereby conserving manual labor, making the process of drilling more rapid, and eliminating the danger of damage to the crops.

I also desire that it be understood that various changes may be made in the several details of construction without departing from the spirit of the invention and without sacrificing any of the advantages thereof.

Having now fully shown and described the invention, what I claim and desire to secure by Letters Patent of the United States, is—

1. A corn stalk turner comprising side bars, a bow connecting the forward ends of the side bars, a body bar connecting the rear ends of the side bar, means carried by the body bar for permitting an animal to be hitched thereto, which animal may be located between the side bars, a stempost extending rearward and upward from the bow, braces connecting the upper portion of the stempost with the side bars, sheet metal connected to and extending over the stempost, the bow, and the braces, and means for adjustably and detachably suspending the forward portion of the device from the hames of an animal.

2. A corn stalk turner comprising a body bar adapted to be connected to an agricultural machine, a frame formed of a single length of material providing two spaced apart side bars connected by a bow which is remote from the body bar, means for rigidly connecting the ends of said frame to said body bar, a stempost having one end secured to the center of said bow from which it projects rearward and upward, braces connecting said side-bars to the stempost, sheet metal connected to the bow, the stempost, and the braces and covering the spaces therebetween, means carried by the upper portion of the stempost for suspending the forward end of the device from the hames of an animal located between the side bars, and means for attaching the animal to said body bar, all substantially as shown and described.

3. A corn stalk turner comprising a body bar, a hook-bolt connecting the center of the body bar to an agricultural machine, side bars having their end portions contacting with the end portions of the body bar, U-shaped bolts securing the ends of the side bars to the body bar, a bow integrally connecting the forward ends of the side bars, a stempost secured at one end to the center of said bow and extending rearward and upward with its upper portion in approximate vertical positions, braces connecting the upper portion of the stempost with the side bars, a sheet metal member connected to the stempost and the braces and covering said bow, flexible means attached to the stempost and adapted to be attached to the harness of an animal located between the side bars in order to suspend the forward end of the turner a short distance above the ground, and means for supporting the forward end of the turner at a greater distance from the ground than that provided by said flexible means, all substantially as shown and described.

In testimony whereof I have hereunto subscribed my name to this specification in the presence of two subscribing witnesses.

WALTER A. HUNNICUTT.

Witnesses:
 ROBT W. RANDLE,
 R. E. RANDLE.

Copies of this patent may be obtained for five cents each, by addressing the "Commissioner of Patents, Washington, D. C."